United States Patent [19]
Christiansson et al.

[11] Patent Number: 5,806,735
[45] Date of Patent: Sep. 15, 1998

[54] LOAD CARRIER

[75] Inventors: Magnus Christiansson, Åsenhöga; Fredrik Wallin, Vänamo, both of Sweden

[73] Assignee: Industri AB Thule, Hillerstorp, Sweden

[21] Appl. No.: 565,195

[22] Filed: Sep. 26, 1995

[51] Int. Cl.⁶ .................................................. B60R 9/04
[52] U.S. Cl. ........................ 224/322; 224/321; 224/319
[58] Field of Search .................................. 224/309, 321, 224/322, 315, 325, 326, 331, 924; 248/231.41, 231.4, 516.4

[56] References Cited

U.S. PATENT DOCUMENTS

| | | | |
|---|---|---|---|
| 3,677,451 | 7/1972 | Burland | 224/322 |
| 3,877,622 | 4/1975 | McLain | 224/924 |
| 4,101,061 | 7/1978 | Sage et al. | 248/231.41 |
| 5,275,320 | 1/1994 | Duemmler | 224/322 |
| 5,419,479 | 5/1995 | Evels et al. | 224/322 |

FOREIGN PATENT DOCUMENTS

| | | | |
|---|---|---|---|
| 487132 | 5/1992 | European Pat. Off. | 224/331 |
| 504588 | 9/1992 | European Pat. Off. | 224/309 |
| 578297 | 6/1993 | European Pat. Off. | 224/331 |

*Primary Examiner*—Henry J. Recla
*Assistant Examiner*—Gregory M. Vidovich
*Attorney, Agent, or Firm*—Royston Rayzor Vickery Novak & Druce

[57] ABSTRACT

A load carrier for a vehicle has a load carrier bar which, at opposite ends, has anchorage devices for fixing on longitudinal so-called railings on the vehicle root. The anchorage devices have two clamping jaws (14) which, from opposite sides, are urgable against the railings. The one clamping jaw (14) has a sliding body (20) which is disposed in a channel (6) in the load carrier bar and has a free-going aperture (25) for a screw (21). The other clamping jaw (14) has a wedge body (17) slidable in the channel and provided with a through aperture (25) for the screw (21). The wedge body (17) of the clamping jaw (14) cooperates in the channel (6) with a second wedge body (19) which has a threaded aperture (26) for the screw. By tightening the screw (21), the wedge bodies (17, 19) are tightened towards one another and positionally fixed in the channel (6) at the same time as the clamping jaws (14) are forced towards one another.

19 Claims, 3 Drawing Sheets

LOAD CARRIER

TECHNICAL FIELD

The present invention relates to a load carrier with a load carrier bar which, at opposite ends, has an engagement device for securing the load carrier bar onto a carrier, for example a so-called railing, which is secured, for example, on a vehicle roof, the engagement device being, for its anchorage in the load carrier bar, in communication with wedge bodies which are disposed in a channel in the load carrier bar and are tightenable towards one another.

BACKGROUND ART

In the employment of so-called roof railings on vehicles, these are as a rule assembled ex-works, for which reason the distances between the railings are carefully established and specified for each vehicle type. The transverse load carriers which are secured on the railings for carrying different types of loads can, as a result, easily be designed as special accessories which are adapted to each vehicle type or model. In this instance, such adaptation has been made both in respect of the distance between the railings and in respect of the cross-sectional configuration of the railings.

It will be apparent from the foregoing that prior art designs and constructions have related to but a single, or possibly a small number, of different vehicle types.

PROBLEM STRUCTURE

The present invention has for its object to realize a load carrier of the type disclosed by way of introduction, the load carrier being designed in such a manner that it permits dependable and reliable fixing of the load carrier bar on railings irrespective of their mutual spacing and their cross-sectional configuration. The present invention further has for its object to realize a load carrier which is simple and convenient in use, which may be manufactured cheaply and simply, and in which the risk of loose details and parts disappearing is eliminated, and finally in which securement of both the load carrier bar to the railing and securement of the accessories to the load carrier bar may simply be locked in position.

SOLUTION

The objects forming the basis of the present invention will be attained if the load carrier intimated by way of introduction is characterized in that the engagement device includes clamping members which, from opposite sides, are urgable towards the carrier under the action of a tightening device, the same tightening device also being disposed, on activation, to tighten the wedge bodies towards one another and thereby positionally fix the engagement device in the load carrier bar.

The above-outlined features afford the major advantage that the engagement device, with deactivated clamping device, may readily be displaced in the longitudinal direction of the load carrier bar at the same time as the engagement device may simply, under the action of a single clamping device, be activated and secure the load carrier bar to the railing. Further advantages will be attained according to the present invention if the subject matter of the present invention is also given one or more of the characterizing features as set forth in the appended claims.

BRIEF DESCRIPTION OF THE ACCOMPANYING DRAWINGS

The present invention will now be described in greater detail hereinbelow, with particular reference to the accompanying Drawings. In the accompanying Drawings.

DESCRIPTION OF PREFERRED EMBODIMENT

Figure 1:
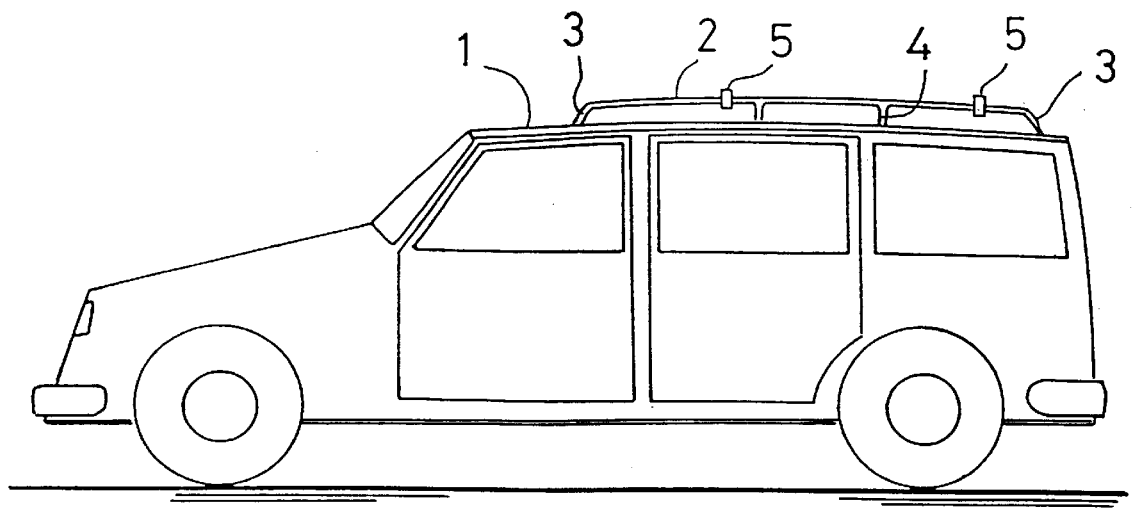
FIG. 1 is a side elevation of a vehicle provided with railings.

FIG. 1 shows, from the side, a vehicle of the so-called shooting brake or estate wagon type, the vehicle having a roof 1 with longitudinal load carriers 2, so-called railings, mounted thereon, the railings being, at their front and rear ends, permanently connected to the vehicle roof via feet 3. In such cases when the railings 2 are of considerable length, one or more additional feet 4 may be employed for supporting the railings. It should be observed that the distance between the railings need not correspond at the front and rear ends, so that, as a result the railings of necessity are not entirely parallel with one another. Neither need the railings be rectilinear seen from above, but may be arched in a manner which follows the arching of the edge line of the vehicle roof 1.

While the present invention will be described as applied to a railing, it is self-evident that it may also be applied to other types of carriers, for example such carriers as may be placed over the boot lid of a vehicle, behind the vehicle or along the rear end wall of the vehicle.

The subject matter of the present invention comprises a load carrier bar 5 which, in the practical version with railings 2, is disposed to be placed preferably on the upper side of the railings, transversely of the longitudinal direction of the vehicle, and to be connected to the railings. To this end, the transverse load carrier bar 5 is provided at each end portion with an engagement device which, on the one hand, is movable in the longitudinal direction of the load carrier bar and which, on the other hand, permits fixing on the longitudinal railings irrespective of the cross-sectional configuration of the railings and the position along the load carrier bar. Since the engagement devices are movable along the length of the load carrier bar 5, one and the same load carrier bar can be employed on a plurality of different vehicle types in which the distance between closely adjacent railings may vary. Further, one and the same load carrier bar may be displaced along the length of the railings even though the mutual spacing therebetween can vary.

The load carrier bar 5 is designed with a longitudinal channel 6 which, in the illustrated embodiment, is of rectangular cross section, but which, of course may display a differently shaped cross section, for example circular, trapezoidal, triangular or other optional cross-sectional configuration. The load carrier bar 5 is provided, over the longitudinal channel 6, with a longitudinal undercut space 7 which is open upwards via a slot-shaped longitudinal aperture 8. The purpose of this longitudinal undercut space 7 is to permit securement of different accessories, for example holders for transporting bicycles, windsurfing boards, skis and the like on a transverse load carrier bar.

Laterally, both the longitudinal channel 6 and the undercut space 7 are defined by vertical walls 9 which extend between the lower defining wall 10 of the load carrier bar 5 and up to the upper defining wall 11. The upper and lower defining walls are united to one another via side walls (not shown)

which are turned to face forwardly and rearwardly in the direction of travel of the vehicle in accordance with FIG. 1.

The lower wall 10 in the transverse load carrier bar 5 has a longitudinal slot 12 which extends from the end 13 of the load carrier bar 5 and a certain distance inwards towards the central portion of the bar. The length of this slot or groove 12 determines that adjustment region in the longitudinal direction of the load carrier bar 5 which is permitted for the engagement devices.

Each engagement device includes two clamping members 14 which have mutually facing clamping surfaces 15 which are located more proximal one another at their ends located a distance from the bar 5 than at their ends located most proximal the bar. As a result, the clamping surfaces 15 will together form an undercut space between the two clamping members 14 and this undercut space is intended for accommodating the longitudinal railings 2. By compressing the clamping devices 14 towards one another, the railing will thus be held in a firm and secure grip.

The clamping members 14 are provided with neck portions 16 which extend through the longitudinal slot or aperture 12 in the lower wall 10 of the bar 5.

The width of these neck portions 16 is such that the clamping members 14 may be slid essentially without play in the longitudinal direction of the bar 5. Interiorly in the longitudinal channel 6, the one clamping member 14 (the left-hand or innermost shown, in FIG. 2) has a wedge body 17 with a wedge surface 18 which cooperates with a corresponding wedge surface on second wedge body 19. The cross-sectional configuration of the two wedge bodies 17 and 19 is such that it substantially fills out the cross section in the longitudinal channel 6. At any rate, the wedge bodies have an outer contour which satisfies this criterion. By compression of the two wedge bodies 17 and 19 towards one another, these strive to be displaced transversely of the longitudinal direction of the longitudinal channel 6 so that thereby the wedge bodies are locked in place interiorly in the channel.

The second clamping member 14 (the right-hand or outermost in FIG. 2) is provided with a sliding body 20 of a cross-sectional configuration which substantially fills out the cross section of the longitudinal channel 6. At least, the outer contour of the sliding body is designed in this fashion.

It will be apparent from the foregoing disclosures that the two wedge bodies 17 and 19, as well as the sliding body 20 are slidable substantially without play in the longitudinal direction of the channel 6.

For operating the above-described components, the subject matter of the present invention includes a tightening device which, on activation, realizes on the one hand compression of the two clamping members 14 towards one another and, on the other hand, positional fixing of the entire engagement device in a selected position of adjustment along the length of the load carrier bar 5.

The tightening device includes a screw 21 which extends in the longitudinal direction of the channel 6 and which, on tightening, is disposed to draw the sliding body 20 and the second wedge body 19 towards one another. Further, the tightening device includes a spring 51 which is disposed between the first wedge body 17 and the sliding body 20 and which strives to displace the two clamping members 14 away from one another at the same time as it realizes a relatively weak urging of the two wedge bodies 17 and 19 towards one another so that, thereby, the engagement device is to some extent positionally fixed in the channel 6 or, at any rate, does not freely slide back and forth.

In order to make possible displacement of the engagement device along the channel 6, the second wedge body 19 has an operating portion 22 which extends out through the groove or slot 12. On displacement of the engagement device in a direction to the left in the FIG. 2, the operating portion 22 is grasped and slid in the same direction. On displacement of the engagement device in a direction to the right, the left-hand clamping member 14 is instead grasped and slid out towards the end 13 of the bar 5. By grasping either the operating portion 22 or the clamping member 14, depending upon the desired direction of displacement, the wedge effect between the wedge bodies 17 and 19 realized by the spring will be cancelled.

Figure 4:
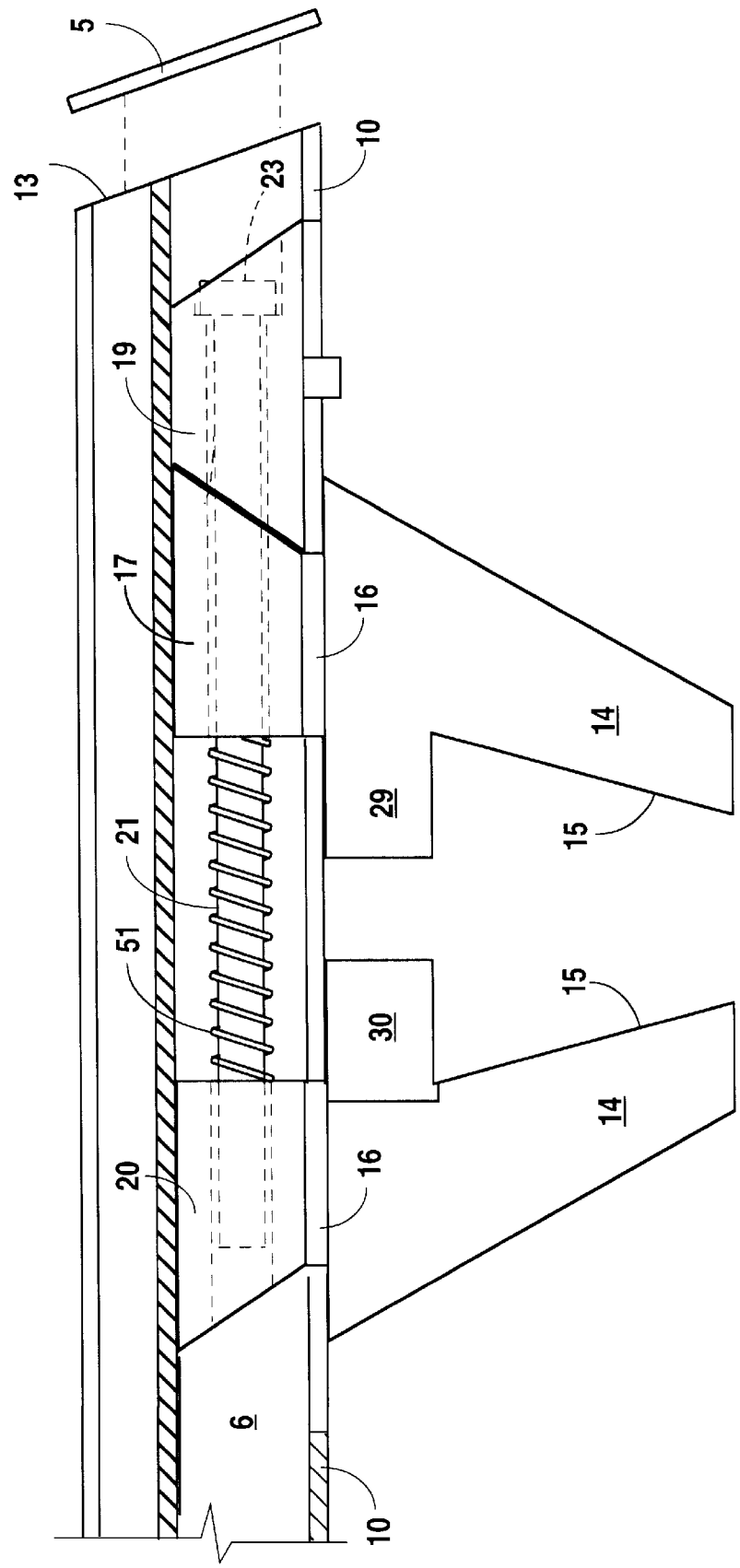
FIG. 4 is a broken section through an end portion of an alternative embodiment of the transverse load carrier bar shown in FIG. 2.

The screw 21 has a head 23 which is accommodated in a bore 24 in the end surface of the sliding body 20 facing towards the end 13 of the bar 5. The bore 24 connects to a tighter bore 25 in the sliding body, the screw 21 having free passage in this bore. In a corresponding manner, the wedge body 17 has a bore 25 with free passage for the screw, and suitably also a bore 24 which is mirror-reversed but otherwise identically designed in relation to the bore 24 in the sliding body 20. On the other hand, the wedge body 19 has a bore 26 which is threaded for threading engagement with the screw 21. In this configuration illustrated in FIG. 4, the screw 21 is in threaded engagement with the sliding body 20, extends freely through the first wedge body 17, and with head 23 engages with the second wedge body 19.

Figure 2:
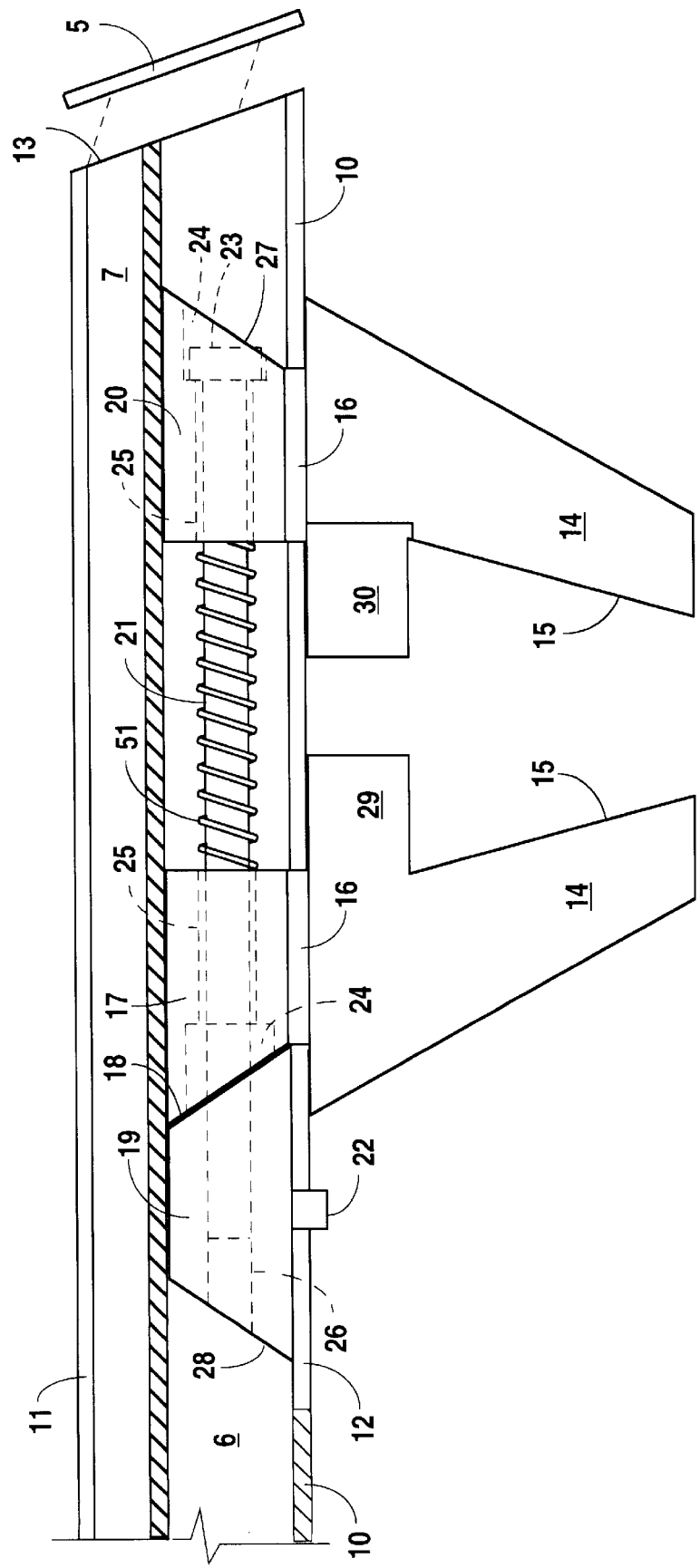
FIG. 2 is a broken section through an end portion of a transverse load carrier bar intended for securing on the railings.

According to the present invention, it is not necessary that the end surface of the sliding body $2_0$ facing towards the end 13 of the bar 5 have the configuration shown in FIG. 2, but the end surface 27 may be substantially at right angles to the longitudinal direction of the screw 21. However, production engineering advantages will be afforded if the end surface 27 is obliquely inclined so that it has the same inclination as the wedge surface 18. Hereby, the sliding body 20 and the wedge body 19 can be identically designed so that one and the same part can be employed in the two different positions of use.

Correspondingly, the inner end surface 28 need not have that oblique inclination which is shown in the Figure, but this end surface may have any optional configuration and direction. However, production engineering advantages will also be afforded here if the end surface is given the same inclination as the wedge surface 18 so that, hereby, the wedge body 19 will be optionally turnable in any direction.

As has been considered above, production engineering advantages stand to be gained if the clamping members with the wedge body 17/ the sliding body 20 can be manufactured as identical parts. In order to make this possible, the clamping members 14 have projections 29 which are directed towards one another but which, however (seen in a direction towards and away from the observer of FIG. 2) only cover half of the width of the clamping members 14 so that the left-hand projection 29 in FIG. 2 can be accommodated in a corresponding recess 30 when the clamping members 14 are moved towards one another.

Suitably, the clamping members 14, the neck portions 16 and the sliding body 20 and wedge body 17, respectively, can be manufactured by one piece casting in metal. In order to increase the friction and engagement between the clamping members 14 and the railing 2, the clamping members have, at least on their clamping surfaces turned to face one another, surface coatings of a resiliently yieldable, friction increasing and preferably elastic material. Ideally however, this material can be applied to all of the external surface of the clamping members 14 and also extend out from the upper portions of the clamping members in order to abut against the lower wall 10 of the bar 5 and seal against this wall. Correspondingly, sealing lips manufactured from such material can close at least a part of the longitudinal slot 12 in the underside of the bar 5.

It will be apparent from FIG. 2 that both the undercut space 7 and the channel 6 are open towards the end 13 of the bar 5. In this state, the entire engagement device can therefore quite simply be mounted and dismounted, but accessories may also be slid in onto the bar 5 with anchorage devices sliding in the undercut space 7. In order to prevent unauthorized removal of such accessories as may be secured on the bar 5, but also to prevent the bar 5 from being removed from the railings, the end 13 of the bar is closable by means of a lockable closure arrangement 50 which preferably can encompass or enclose one end portion of the bar 5.

Figure 3:
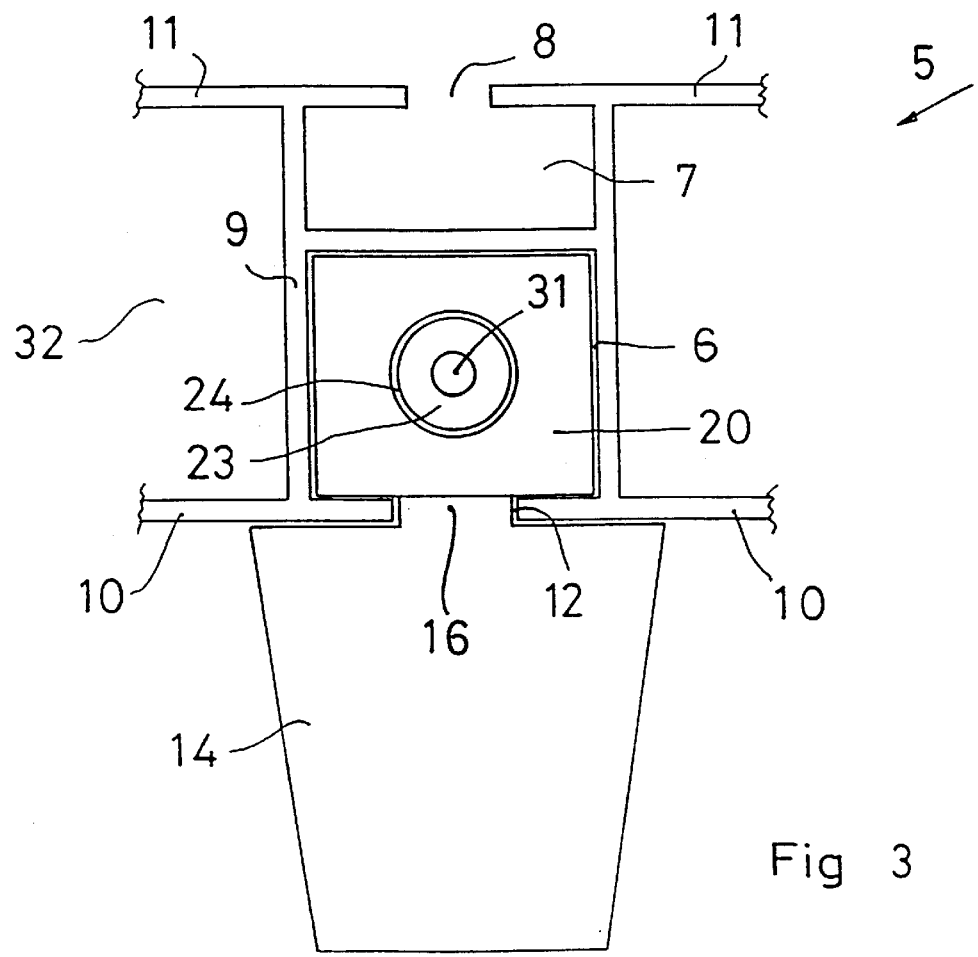
FIG. 3 is an end elevation of the load carrier bar illustrated in FIG. 2.

As is apparent from FIG. 3, the head 23 of the screw 21 is provided with engagement means 31 preferably in the form of a hexagonal socket for accommodating a corresponding hexagonal key or Allen key. The bar 5 is suitably provided, between its upper and lower defining walls 11 and 10 respectively, with an accommodation space 32 for housing this Allen key, the accommodation space being closable towards the end 13 of the bar by means of the closure arrangement disposed there.

DESCRIPTION OF ALTERNATIVE EMBODIMENT

According to the present invention, it is not necessary that the wedge body 19 be located innermost, most proximal the center of the bar 5. Instead, the entire engagement device may be turned about so that the wedge body 19 is located most proximal the end 13 of the bar. In this embodiment, the end surface 28 of the wedge body 19 has a bore or a shoulder which corresponds to the arrangement 24 in the sliding body 20 and, further, the screw 21 is applied with its head 23 in this bore. In this embodiment, the sliding body 20 must be provided with a threaded bore for threaded cooperation with the screw 21.

According to the present invention, the clamping surfaces 15 may be of a different design than that shown in FIG. 2 and, for example, they may be arched for better grasping about a circular profile of a railing 2. Further modifications of the present invention may be made without departing from the spirit and scope of the appended claims.

What is claimed is:

1. A load carrier comprising a load carrier bar which, at opposite ends, has an engagement device for fixedly securing the load carrier bar onto a carrier which is secured on a vehicle roof, the engagement devices each comprising, for their anchorage in the load carrier bar, wedge bodies which are disposed in a channel in the load carrier bar and are tightenable towards one another, characterized in that the engagement device includes clamping members which are urgable towards the carrier under the action of a tightening device, the same tightening device also being disposed, on activation, to tighten the wedge bodies towards one another and toward opposing surfaces of the load carrier bar and thereby positionally fix the engagement device in the load carrier bar.

2. The load carrier as claimed in claim 1, characterized in that a first clamping member is disposed projecting from a sliding body provided in the channel, a second clamping member being disposed projecting from a first of the wedge bodies, while the second wedge body is located on the side of the first wedge body facing away from the sliding body, and the sliding body being, under the action of the tightening device, clampable in a direction towards the second wedge body.

3. The load carrier as claimed in claim 1, characterized in that the clamping members are, when the tightening device is deactivated, slidable in the longitudinal direction of the load carrier bar.

4. The load carrier as claimed in claim 2, characterized in that the first wedge body and the sliding body are connected to each respective clamping member via neck portions which extend out through a longitudinal slot shaped aperture in a wall of the load carrier bar.

5. The load carrier as claimed in claim 2, characterized in that the tightening device includes a screw which is in threaded engagement with the second wedge body which extends freely through the first wedge body and which, with a head, engages with the sliding body.

6. The load carrier as claimed in claim 2, characterized in that the tightening device includes a screw which is in threaded engagement with the sliding body which extends freely through the first wedge body and which, with a head, engages with the second wedge body.

7. The load carrier as claimed in claim 2, characterized in that the wedge bodies and the sliding body have cross sections whose outer contours are substantially complementary to the cross section of the channel.

8. The load carrier as claimed in claim 1, characterized in that the clamping members extend transversely directed out from the load carrier bar and have mutually facing clamping surfaces whose portions located furthest out from the load carrier bar are more proximal one another than portions located closer to the load carrier bar.

9. The load carrier as claimed in claim 5, characterized in that the head has engagement means for a torgue tool; and that the load carrier bar has a space which is open towards its end for storing the torque tool.

10. The load carrier as claimed in claim 2, characterized in that the load carrier bar has, on its upper side parallel with the channel, a longitudinal, undercut groove which is open towards the end of the load carrier bar; and that the end portion of the load carrier bar is closable by means of a lockable closure arrangement.

11. The load carrier as claimed in claim 1, characterized in that the clamping members are provided, at least on their sides facing towards the carrier, with friction increasing, resiliently yieldable surface coatings.

12. The load carrier as claimed in claim 11, characterized in that the surface coatings enclose the portions of the clamping members located outside the load carrier bar; and that they are provided with portions which are disposed to abut and seal against adjacent surfaces of the load carrier bar.

13. The load carrier as claimed in claim 2, characterized in that there is disposed a compression spring in the channel between mutually facing surfaces of the sliding body and the first wedge body.

14. The load carrier as claimed in claim 2, characterized in that the clamping members are, when the tightening device is deactivated, slidable in the longitudinal direction of the load carrier bar.

15. The load carrier as claimed in claim 3, characterized in that the first wedge body and a sliding body are connected to each respective clamping member via neck portions which extend out through a longitudinal slot shaped aperture in a wall of the load carrier bar.

16. The load carrier as claimed in claim 3, characterized in that the tightening device includes a screw which is in threaded engagement with the second wedge body which extends freely through the first wedge body and which, with a head, engages with the sliding body.

17. The load carrier as claimed in claim 4, characterized in that the tightening device includes a screw which is in threaded engagement with the second wedge body which extends freely through the first wedge body and which, with a head, engages with the sliding body.

18. The load carrier as claimed in claim 2, characterized in that the clamping members extend transversely directed out from the load carrier bar and have mutually facing clamping surfaces whose portions located furthest out from the load carrier bar are more proximal one another than portions located closer to the load carrier bar.

19. The load carrier as claimed in claim 1, characterized in that the load carrier bar has, on its upper side parallel with the channel, a longitudinal, undercut groove which is open towards the end of the load carrier bar; and that the end portion of the load carrier bar is enclosable by means of a lockable closure arrangement.

* * * * *